United States Patent
Quick et al.

(10) Patent No.: US 11,023,458 B2
(45) Date of Patent: Jun. 1, 2021

(54) SYSTEMS AND METHODS FOR BLOCKCHAIN INTERLINKING AND RELATIONSHIPS

(71) Applicant: Providentia Worldwide, LLC, Fredericksburg, VA (US)

(72) Inventors: S. Ryan Quick, Fredericksburg, VA (US); Armand Kolster, San Francisco, CA (US)

(73) Assignee: Providentia Worldwide, LLC, Fredericksburg, VA (US)

( * ) Notice: Subject to any disclaimer, the term of this patent is extended or adjusted under 35 U.S.C. 154(b) by 0 days.

(21) Appl. No.: 16/812,848

(22) Filed: Mar. 9, 2020

(65) Prior Publication Data

US 2020/0210386 A1    Jul. 2, 2020

Related U.S. Application Data

(63) Continuation of application No. PCT/US2019/046815, filed on Aug. 16, 2019.
(Continued)

(51) Int. Cl.
| | |
|---|---|
| *G06F 16/23* | (2019.01) |
| *H04L 9/06* | (2006.01) |
| *G06F 16/182* | (2019.01) |
| *G06F 16/901* | (2019.01) |
| *G06F 9/54* | (2006.01) |

(Continued)

(52) U.S. Cl.
CPC ............ *G06F 16/2379* (2019.01); *G06F 9/54* (2013.01); *G06F 16/1837* (2019.01); *G06F 16/9024* (2019.01); *G06F 21/602* (2013.01); *H04L 9/0637* (2013.01); *H04L 9/30* (2013.01); *H04L 2209/38* (2013.01)

(58) Field of Classification Search
CPC ...... G06F 16/2379; G06F 9/54; G06F 21/602; G06F 16/1837; G06F 16/9024; H04L 9/0637; H04L 9/30; H04L 2209/38; H04L 9/3255; H04L 9/006; H04L 9/3297; H04L 9/3239; G06Q 20/223; G06Q 20/38
See application file for complete search history.

(56) References Cited

U.S. PATENT DOCUMENTS

| | | | |
|---|---|---|---|
| 9,330,416 B1 | 3/2016 | Zaslavsky et al. | |
| 9,569,771 B2 | 2/2017 | Lesavich et al. | |

(Continued)

FOREIGN PATENT DOCUMENTS

WO    WO 2018/007828 A2    1/2018

OTHER PUBLICATIONS

Joseph Poon and Vitalik Buterin, "Plasma: Scalable Autonomous Smart Contracts," Aug. 11, 2017 (Year: 2017).*

(Continued)

*Primary Examiner* — Charles D Adams
(74) *Attorney, Agent, or Firm* — Sterne, Kessler, Goldstein & Fox P.L.L.C.

(57) ABSTRACT

This disclosure describes systems and methods for interlinking multiple independent and separately-scalable blockchains to provide transactional provenance. The disclosed systems and methods leverage a combination of blockchain and graph data structures to interoperate between blockchains without requiring a single data structure while still providing a single chain of custody and provenance for a particular set of actions.

18 Claims, 14 Drawing Sheets

Related U.S. Application Data

(60) Provisional application No. 62/721,889, filed on Aug. 23, 2018.

(51) Int. Cl.
    *G06F 21/60*     (2013.01)
    *H04L 9/30*     (2006.01)

(56) References Cited

U.S. PATENT DOCUMENTS

| | | |
|---|---|---|
| 2016/0330034 A1 | 11/2016 | Back et al. |
| 2017/0116693 A1 | 4/2017 | Rae et al. |
| 2018/0260921 A1* | 9/2018 | Wagstaff ................ G06Q 50/18 |
| 2019/0190696 A1* | 6/2019 | Singh .................... H04L 9/0637 |
| 2019/0238316 A1* | 8/2019 | Padmanabhan ....... H04L 9/3297 |
| 2020/0007581 A1* | 1/2020 | Vouk .................... H04L 9/3239 |

OTHER PUBLICATIONS

Dubey, et al., "Weaver: A High-Performance, Transactional Graph Database Based on Refinable Timestamps," Proceedings of the VLDB Endowment, vol. 9, No. 11, Copyright 2016, accessible at http://www.vldb.org/pvldb/vol9/p852-dubey.pdf.

International Search Report and Written Opinion of the International Search Authority directed to related International Patent Application No. PCT/US2019/046815, dated Nov. 5, 2019, 10 pages.

* cited by examiner

200A

Chain

| Chain_Id | Owning_Entity | Chain_Name | Chain_Address? | Genesis_Block_Id | Trans_Id | Token_Type |
|---|---|---|---|---|---|---|
| 1000 | PW | 104A | PW_1000 | 0 | 0x80z72e7a86f7b37dd38e1073 | 1 |
| 1001 | A0 | 110A | PW_1001 | 0 | 0xe876534gr5e0f320ba8fe54b | 2 |
| 1002 | C | 110C | PW_1002 | 0 | 0x492b579ff1ca2fbbabdc32dad9 | 3 |
| 1003 | E | 110E | PW_1003 | 0 | 0xfcfbf991fc829d41248c59d206 | 4 |

Entity

| Entity_Id | Chain_Id | Block_Id | Transaction_Id |
|---|---|---|---|
| 10 | 1001 | 2 | 0xebd5d5dd2432d68b51babf4800b2c4a2ceefa8f23aa6a18e8915db81801dc7 |
| 11 | 1001 | 3 | 0xe376b01117e07f320ba8fe54ab0d0773485c7d79be0d9227db95f52e19286 |
| 12 | 1001 | 6 | 0x20d23b66746da479981a10870de597a23269f02d2d62afed976eb831be2a |

Entity_Chain_Links

| Entity_Chain_Link_Id | Chain_Id | Block_Id | Transaction_Id | Linked_Chain_Id | Linked_Transaction_Id |
|---|---|---|---|---|---|
| 100 | 1001 | 11 | 0xfec75d0dec103e4a6ea1759b42a86b | 1002 | 0 0x1e0211489f09301c24ec193 |
| 101 | 1002 | 12 | 0x150f4e572eb59da20870df274eb240f | 1003 | 0 0x150f4e572eb59da20870df |

Token

| Token_Id | Token_Name | Description | Value? | Created_Date | Created_By | Last_Modified | Last_Modified_By |
|---|---|---|---|---|---|---|---|
| 1 | Providence | Main token | | | | | |
| 2 | | Gas token | | | | | |
| 3 | | | | | | | |

FIG. 2D

SYSTEMS AND METHODS FOR BLOCKCHAIN INTERLINKING AND RELATIONSHIPS

CROSS REFERENCE

This application is a continuation of International Application No. entitled "Systems and Methods for Blockchain Interlinking and Relationships," with an international filing date of Aug. 16, 2019, which claims the benefit of, and priority from, U.S. Provisional Patent Application No. 62/721,889, entitled "Systems and Methods for Blockchain Interlinking and Relationships," filed Aug. 23, 2018, the entire disclosure of which is incorporated herein by reference.

BACKGROUND

One of the core problems with blockchain technologies, a form of distributed ledger technology ("DLT"), involves scalability and an inability to effectively search for entities along a single structure. Most of the underlying technology efforts focus on two objectives: ensuring that the verification of objects in the blockchain is handled securely and efficiently and providing network trust through egalitarian measures like decentralization at the expense of operational scalability. This disclosure outlines several approaches for making operational changes to blockchain management technologies to address these issues. These technology improvements are agnostic to the underlying blockchain implementations and offer means by which to integrate multiple different implementations.

BRIEF DESCRIPTION OF THE DRAWINGS/FIGURES

FIG. 2A-2D are tables illustrating information stored in a graph database reflecting portions of the N-Dimensional Blockchain Management Structure of FIG. 1, according to some embodiments.

DETAILED DESCRIPTION

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

1 Multiple Blockchains Aggregated and Linked

This disclosure describes systems and methods for interlinking multiple independent and separately-scalable blockchains to provide transactional provenance. The disclosed systems and methods leverage a combination of blockchain and graph data structures in order to interoperate between blockchains without requiring a single data structure but still providing a single chain of custody and provenance for a particular set of actions. The disclosed systems and methods may also include and leverage relational data structures. These links are agnostic to the specific implementation of the underlying data structure as long as the metadata is recorded as detailed in this disclosure. While this disclosure describes the systems and methods as using blockchain technology, other forms of distributed ledger technology may be employed including directed acyclic graph ledgers, distributed coordinated synchronizers and file systems, ordered key-value stores, and certified message delivery systems.

Figure 1:
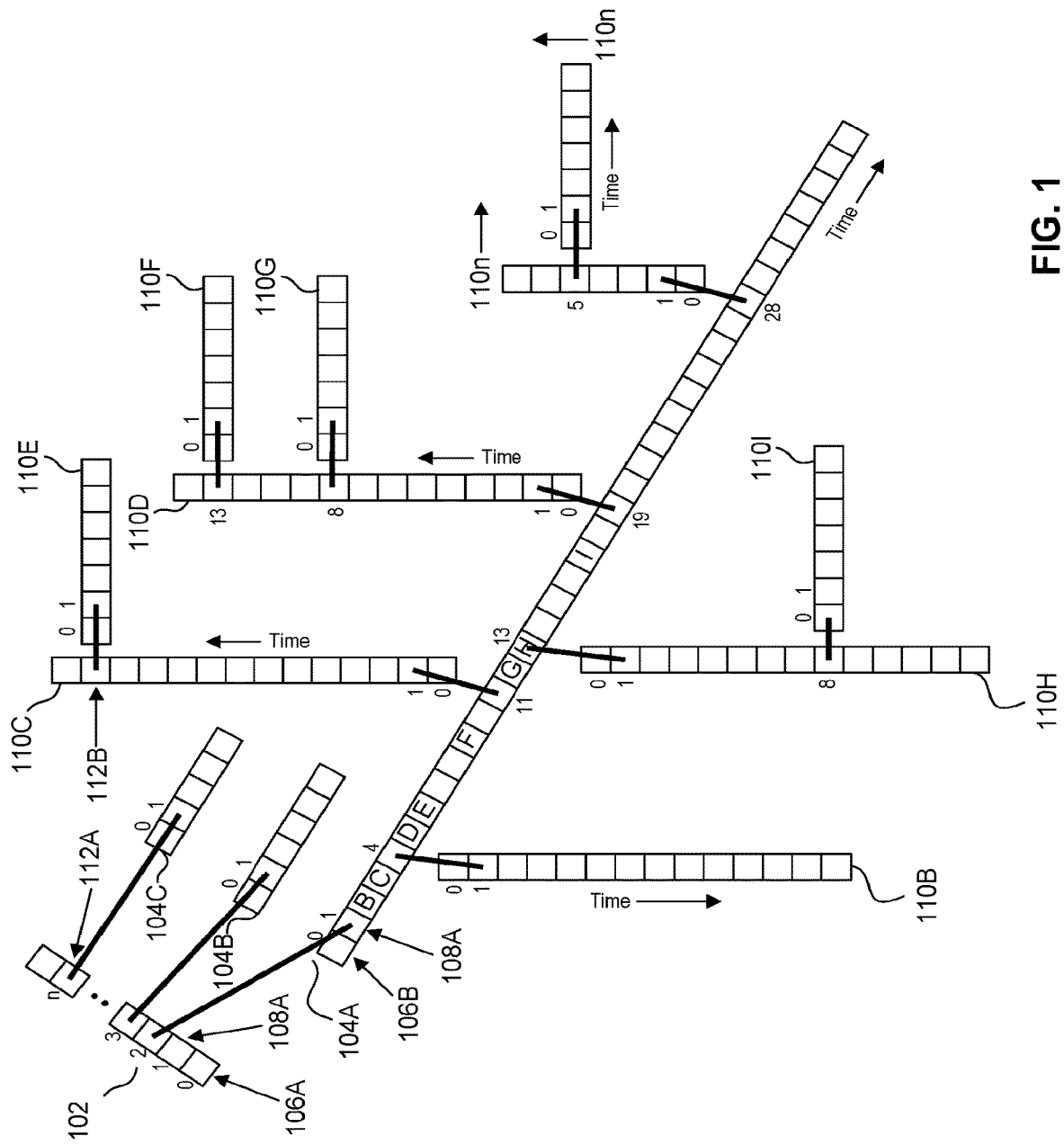
FIG. 1 illustrates an example N-Dimensional Blockchain Management Structure, according to some embodiments.

Disclosed herein, and illustrated in FIG. 1, are systems and methods for maintaining a series of core blockchains, such as N-Dimensional blockchain structure 100, that maintain initial entities and their sub-blockchain links. In some embodiments, a blockchain is an implementation of a blockchain data structure that provides for provenance, is tamper-proof, and creates an append-only, immutable data format after consensus algorithms place the next block into the accepted blockchain. There are a variety of existing blockchains that meet these criteria, some of which include (but are not limited to) ETHEREUM, BITCOIN, DASH, RIPPLE, MONERO, TEZOS, EOS, CORDANO, HYPERLEDGER, MOVE, LIBRA, and/or R3. Within a specific implementation of blockchain, a block type is the descriptor of the type of transactions contained within a particular block. On many blockchains, this is a mixed combination of transaction types. Herein, a specific transaction type may (but does not necessarily) require its own block that can be described through internal or external mechanisms to the blockchain based on the implementation decisions at the time. Block types may be mixed within the same blockchain. Alternatively, blockchains may be separated or combined based on block type.

The process by which a blockchain data structure is governed and secured may be referred to, in some embodiments, as mining. Mining involves a process by which a collection of miners perform one or more of the following:
a) Locate the next viable block in the blockchain.
b) Fill that block with transactions according to the block type.

c) Validate that those transactions are accurate, correct, secure, signed, attributed, and generally provide the necessary guarantees that ensure a valid transaction within that block type.
d) Cement the block into the blockchain and control malleability according to the rules governing that blockchain.
e) Provide a system of rewards for successful mining according to the rules and tokens governing that blockchain.

Mining may be performed by one or more miners. A miner may be a computer system that provides mining capabilities to a blockchain according to the rules governing that blockchain.

In some embodiments, an entity is any object that has attributes that describe its function and which participates in some transaction in time. An entity may be (but is not limited to) an actor (an actor entity), a relationship (a relationship entity), a value (a value entity), or a blockchain (a blockchain entity). This includes conventional concepts like actors, currencies, and behaviors, but also includes relationships, embodiments, transactional blockchains, and the like. In some embodiments, a sub-blockchain is a blockchain which exists under the governance of an entity which exists on the blockchain from which the sub-blockchain spawns.

Figure 10:
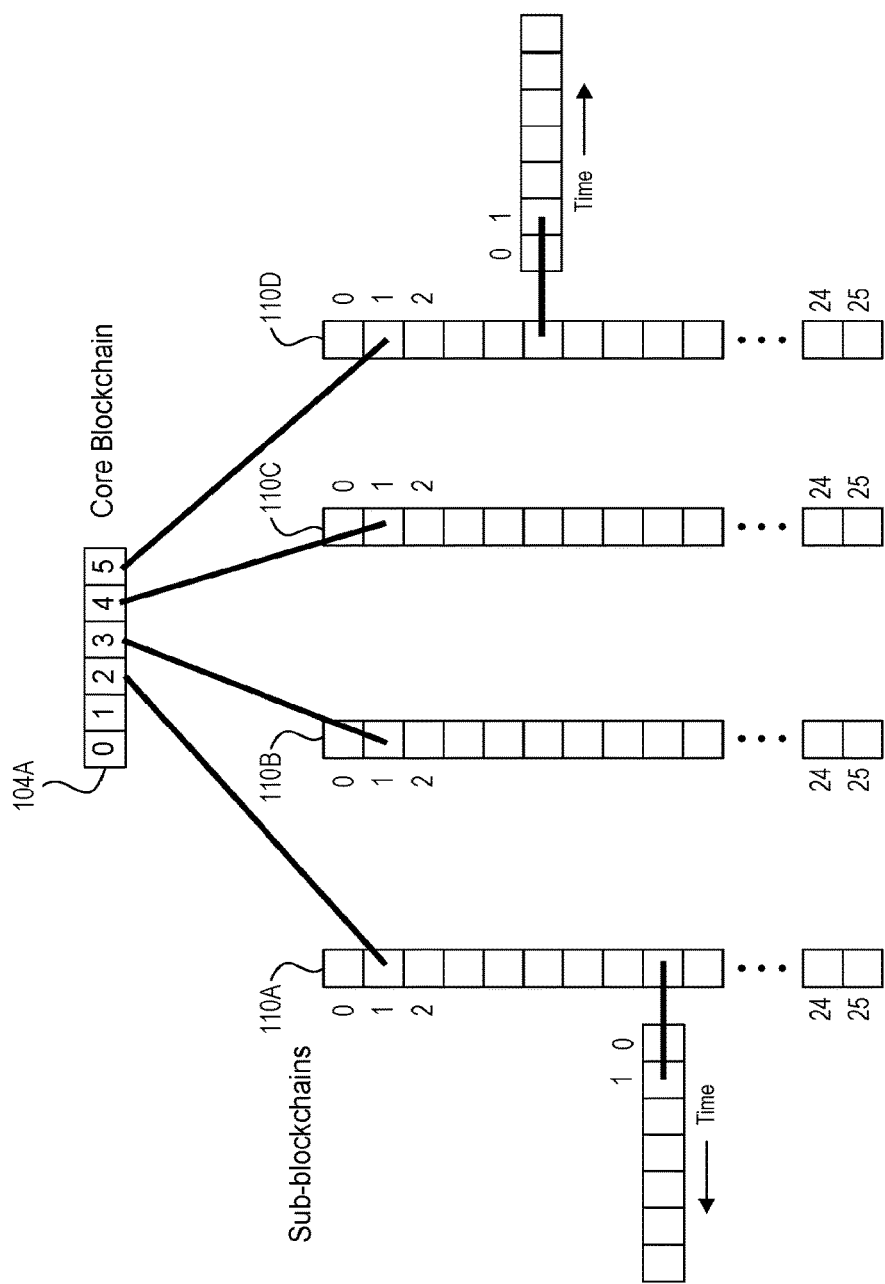
FIG. 10 is a diagram illustrating an example of blockchain sharding, according to some embodiments.

The transactional data in core blockchains, such as core blockchains 104, holds provenance for blockchain and entity creation. The systems and methods described herein may implement a series of shards by entity to create a parallel structure or structures that hold ordered history for the entities in its range. In a sharding scheme, horizontal partitioning of data may be achieved by deriving a shard key from the data of interest using algorithms such as but not limited to modulus, consistent hashing, or text mapping. Therefore, an entity range may be the governing subset of blockchains for which a particular core shard holds stewardship. For example, FIG. 10 illustrates 4-way shard model 1000 for one-hundred sub-blockchains. In this illustrative embodiment, the entity range for shard 1 may be sub-blockchains 01-25 and shard 2 may be sub-blockchains 26-50. In this example, shard 1 may have blockchain identifier 01-25, and shard 2 may have blockchain identifier 26-50. The range itself may thus be represented in the blockchain identifier, is self-evident, and does not require any external resources from that blockchain to understand the slice of history contained therein.

In cases where the entity range is not readily represented in the blockchain identifier, then the blockchain may record the entity range definitions in the linking and header blocks. For example, given a case where there are four shards, the entity ranges may be distributed in an external fashion, as by a load-balancer using a weighted round robin facility. In such an example, the rules governing owned blockchains may be stored in the blockchain itself. This manner of sharding through header and linking blocks may be used for load-balancing, dynamic provisioning, consensus agreements, programmatic outputs, arithmetic algorithms, parallel processing optimizations, workload dispersal methods, affinity rules, hashing and modulus algorithms, community detection, clustering algorithms, support vector machines, decision trees, computer learning methods, computer vision methods, sorting algorithms, artificial intelligence (AI), neural networks, or other distributed and parallel computing workload divisors.

As many core blockchains 104 as necessary may be created and may be continually added over time by adding additional entity ranges to track. This may ensure that there are never too many transactions against any particular blockchain to cause a performance degradation. As an append-only data structure, one of the key operational difficulties with traditional blockchain systems is the increasing length of the blockchain over time. Traversal of very large blockchains is resource intensive and computationally expensive for many computer systems. Managing large blockchains can cause operational difficulty in ensuring consistent performance and reliability over time. Sharding core blockchains 104 improves both atomic reliability and overall transactional availability by maintaining shorter blockchains and providing a means to move new operations away from larger blockchains as operational requirements demand. The systems and methods described herein may leverage many blockchains to provide hundreds of thousands of transactions per second against N-dimensional blockchain structure 100. Actual usage rates may be any transaction rate as required by implementation needs. This transactional scalability presents a substantial increase in speed over existing blockchain technologies.

In the systems and methods described herein, blockchain technologies are used as the system of record ("SOR") for behaviors. In some embodiments, a behavior is any sort of action that can be attributed to an entity. Behaviors are recorded on a blockchain. A behavior may be cached or hinted at by other mechanisms, but must persist on a blockchain. This includes relationships. Relationship blockchains must be created before the associated link in the graph is recorded, because graph data structures may not effectively provide guaranteed temporal ordering. Which blockchain receives any particular behavioral transaction depends on the type, governance, and origin of the behavior itself. Associated links may provide performance and structure for describing relationships between entities and behaviors and may enhance transitional representations between governed blockchains.

1.1 Core Blockchains 1.1.1 Blockchain Description

Core blockchains 104 may record header blocks, entity information, and blockchain links. This information may be intermixed into the same block or separated into distinct block types, e.g., core blockchain 104A, core blockchain 104B, and core blockchain 104C of FIG. 1. Governance blockchain 102 of FIG. 1 may govern core blockchain 104A, core blockchain 104B, and core blockchain 104C. In some embodiments, on a new blockchain, a header block, such as header blocks 108, is the block immediately following a genesis block, such as genesis blocks 106. Headers blocks 108 may hold metadata about the new blockchain itself, which may include, but is not limited to, reference to the linking block on governance blockchain 102, sharding implementation, currency or trading token, block type, value token, transactional cost, transactional hints, source and destination data types, source and destination repository types, etc. Genesis blocks 106 may be the initial block on a blockchain. For example, in core blockchain 104A of FIG. 1, the block labeled "0" is the genesis block of core blockchain 104A, and the block labeled "1" is the header block of core blockchain 104A.

A link represents a relationship and may be recorded in a graph database as an edge between two nodes, which is the typical data relationship in graph structures. In N-Dimensional blockchain structure 100 in FIG. 1, links are illustrated by the lines connecting the individual blockchains. For example, FIG. 1 illustrates a link between governance blockchain 102 and core blockchain 104A. In some embodiments, on a governing blockchain, a linking block is the block that contains reference information to jump to a new sub-blockchain. This metadata may include, but is not limited to, the new genesis block, blockchain identifier, sharding implementation, and owning entity for the sub-blockchain. The genesis block identifier may also be recorded as part of the metadata in the linking block on a governing blockchain. FIG. 1 also illustrates linking blocks. For example, block "2" of governance blockchain 102 is a linking block, which is linked to header block (block "1") of core blockchain 104A.

Figure 6:
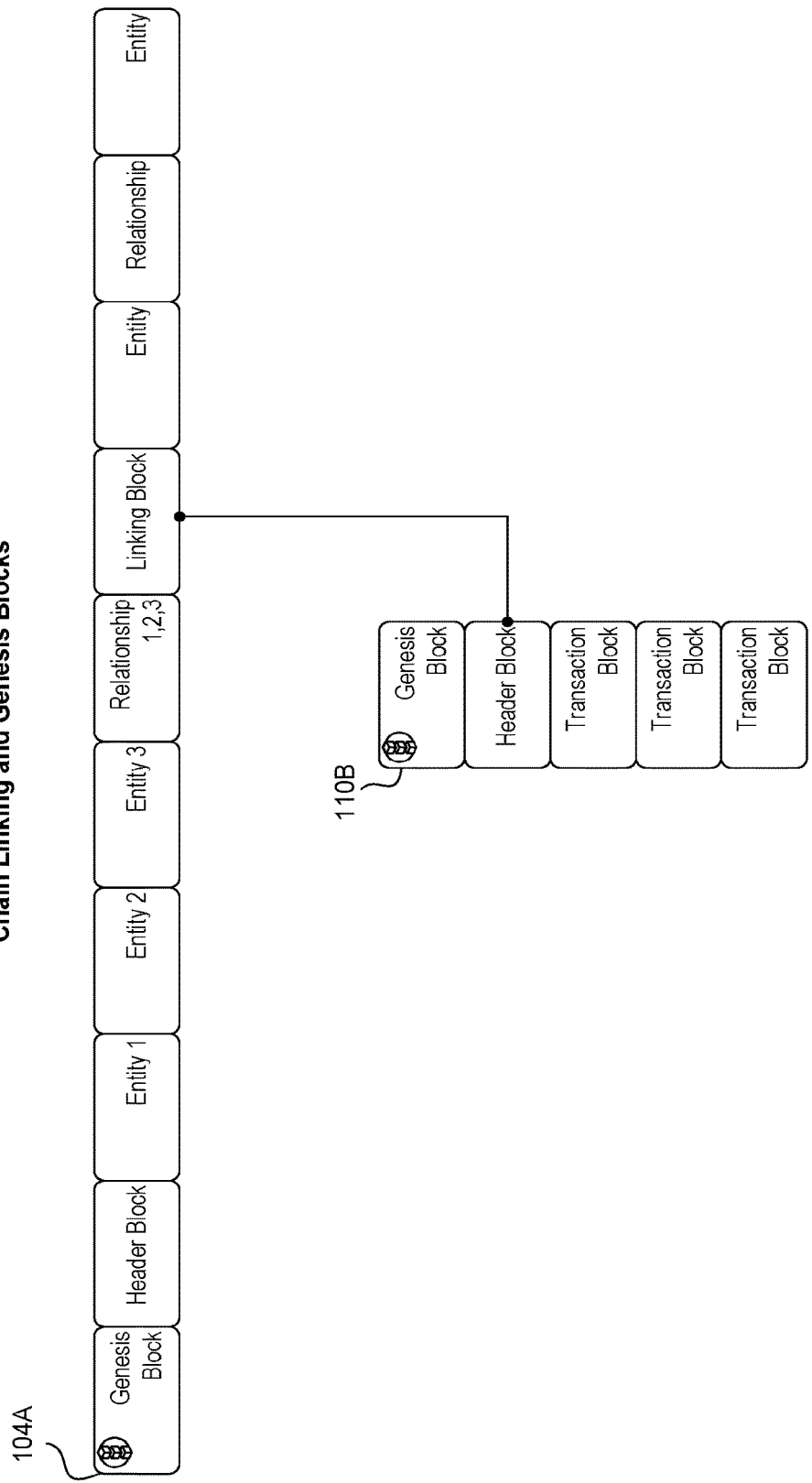
FIG. 6 is a diagram illustrating an example of blockchain linking and genesis blocks, according to some embodiments.

FIG. 6 illustrates linked blockchain 600 and the behavior of linking blocks and genesis blocks between a core blockchain, such as core blockchain 104A, and a sub-blockchain, such as sub-blockchain 110B, which is governed from core blockchain 104A. The linking block in core blockchain 104A and the header block in sub-blockchain 110B may contain the same information used to explain the relationship, governance, and structure of the two related blockchains. In this example, sub-blockchain 110B is subordinate to core blockchain 104A. The header block in sub-blockchain 110B immediately follows its genesis block. Sub-blockchains may function independently from their governing core blockchains for behavior and performance. Governance of a chain may include provenance and end-to-end behavior transaction traversal, but may not impede or influence the transactional nature or functionality of a governed sub-blockchain after the initial creation of said sub-blockchain.

Entity information within core blockchains 104 includes entity attributes that describe the entity including (but not limited to) entity type, entity token, entity creation timestamp, entity creation endpoint, entity creation transaction, observational records, and the like. Core blockchains 104 may provide history for the entities in their ranges and origin for sub-blockchains 110 that link from core blockchains 104. Observational records may vary by use case, but core blockchains 104 may provide a starting point for bringing the history of an entity into the blockchain where there is no prior history. Once in the blockchain, then the blockchains themselves provide ordering, but observational details still provide useful information until that data is persisted and ordering negotiated through consensus. That is to say that event information and metadata such as timestamps, causes, effects, actors, locations, behaviors, relationships, observed changes, contain information which may be relevant to the relationships, entities, behaviors, tokens, and transactions in a blockchain. When moving transactions to a blockchain, then preserving observational data in the blockchain allows for provenance and relevant data security for events which occurred before the blockchain existed. In some embodiments, adding these metadata and event data to the blockchain directly following the creation of the blockchain preserve provenance for that data after the context change to the blockchain.

In some embodiments, transactions for behavior by an entity occur only on sub-blockchains 110 based on governance and relationships (described in other sections). In some embodiments, there is a single exception: governance blockchain 102 (in some embodiments this may be referred to as the Providence blockchain) owns and governs the creation of entities and blockchains and therefore transacts directly on core blockchains 104 for these actions only. Other behaviors of Providence occur on related sub-blockchains. In these embodiments, Providence is the governing value token for the implementation of the blockchain management system. Alternatively, in other embodiments, a non-blockchain entity may be the source of governance, such as (but not limited to) relational data structures like sequence and unique identifiers, global verifiable unique identifiers, keys, values, direct delegation, configuration systems like directories, lookup tables, service announcements, election results, algorithmic and programmatic decisions, load balancers, traffic shapers, firewalls and routers, learning algorithms, rule-based systems, key stores, wallets, and exchange algorithms, cryptographic guarantees and provability, artificial intelligence decisions, and neural network convolutions and results.

Core blockchains 104 may leverage a single value or utility token determined at blockchain creation. In some embodiments, a value and a utility token are the same or similar. In other embodiments, a value token may be different than a utility token: a utility token may provide only the necessary fuel or power behind a behavior which is recorded in a blockchain, whereas a value token may provide for power behind a behavior and may acquire quantitative value in its own right, making the value token itself a desirable asset.

Some embodiments prevent altering the value token for a given blockchain, but behavior may move to additional or alternate value tokens by creating sub-blockchains 110 leveraging that value token. Core blockchains 104 may be created with a specific value token that can be determined through referential query of the blockchain type. In some embodiments, the value token identifier is included in the blockchain identifier.

1.1.2 Core Blockchain Usage

Core blockchains 104 may provide at least the following: ordered history for entity creation, ordered history for sub-blockchain creation, and base linking blocks for sub-blockchains 110, which may be created and embodied elsewhere (e.g., different memory locations). As described herein, entities may act in the World (actor entities), blockchains may record the behaviors of those actor entities as behavior entities (behaviors), and behaviors involving multiple actor entities or reciprocities may be recorded in blockchains allocated specifically for those purposes. In this manner, behaviors themselves may become actors in the World in that they make up actions that occur in the World and that, at the very least, include observable occurrences. In FIG. 6, sub-blockchain 110B may provide transactional data in a blockchain that captures the behavior in the relationship between entities 1, 2 and 3 created on core blockchain 104A.

1.1.2.1 Ordered History for Entity Creation

Entities may have history prior to "coming to the blockchain." For example, this may be as long as an established actor or company with a rich history in the World through other recordable events (e.g., case law in the United States, supply chain records for a large manufacturing organization, transit records for a large shipping concern, patient data for health care providers, claims records for insurance providers, transactions records for securities trading, etc.). Alternatively, this may be as short as a notional relationship between two actors that is created simply because an entity joined the blockchain. For example, an entity A may have a policy through governance of its blockchain such that entity A observes all transactions that take place on the entire blockchain to provide an auditing capability to the blockchain itself. Therefore, any new entity B added to the blockchain automatically creates a relationship with entity A. This new relationship is an entity itself but only comes into existence once entity B joins the blockchain.

FIGS. 5A-D illustrate examples of logical behavior for several sample cases of relationship-transaction interaction using the systems and methods described herein. Each step illustrated in or described with respect to the example diagrams shown in the Figures (e.g., FIGS. 4 and 5A-D) may represent a computer-readable instruction stored on a computer-readable storage device (e.g., computer memory), which, when executed by a processor causes the processor to perform one or more operations.

1.1.2.2 Relationship-Transaction Interaction Examples

Figure 5A:
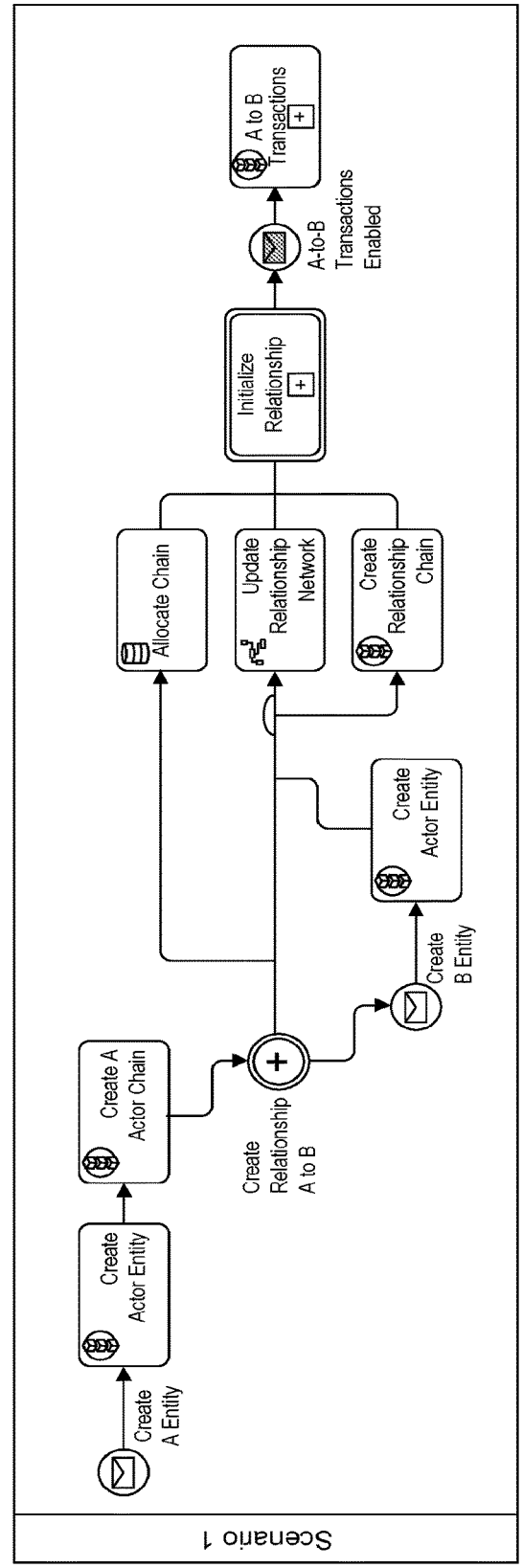
FIG. 5A is a diagram illustrating an example directed relationship-transaction interaction scenario for two entities, according to some embodiments.

FIG. 5A shows an example relationship-transaction interaction 500A for an actor A providing information to an actor B through a series of transactions. To create a relationship between A and B, a workflow first creates actor entity A on a blockchain, creates actor entity B on a later block on that blockchain, and then creates a relationship entity A-to-B on that blockchain. A second blockchain for A-to-B transactions is created once the relationship entity A-to-B exists to govern the A-to-B transactions sub-blockchain. The information provided from actor A to actor B comes in the form of transactions that are recorded on the A-to-B transactions sub-blockchain.

Figure 5B:
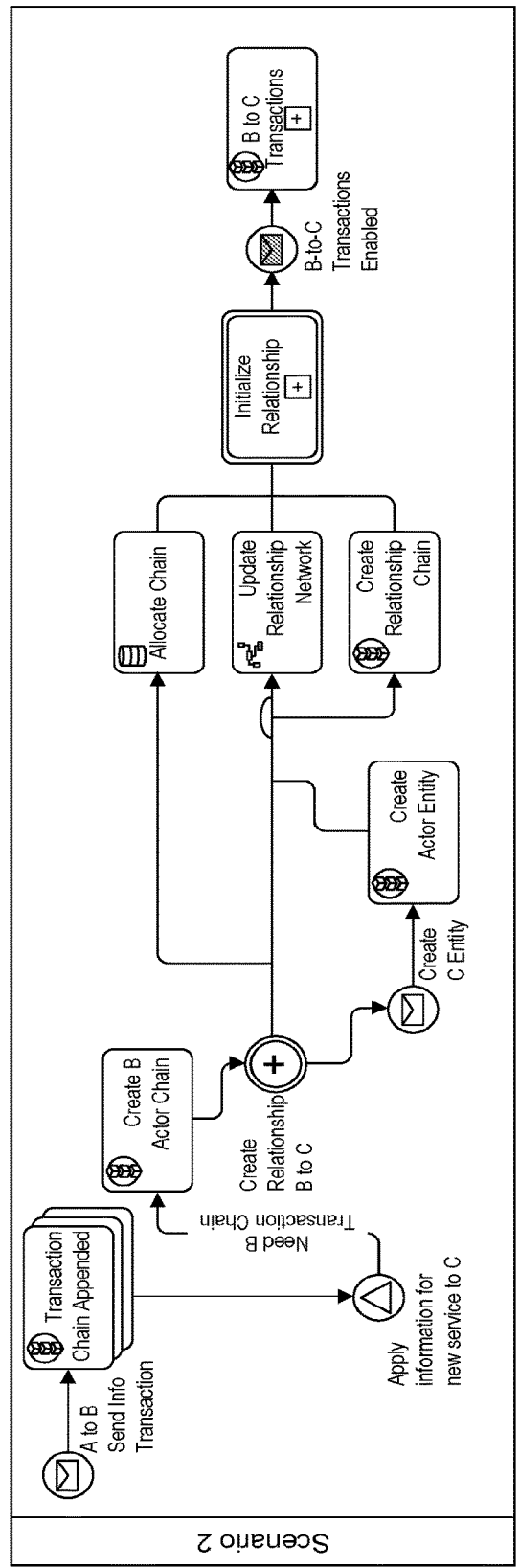
FIG. 5B is a diagram illustrating an example directed relationship-transaction interaction scenario for three entities, according to some embodiments.

FIG. 5B continues the example from FIG. 5A, showing an example relationship-transaction interaction 500B for an actor B who receives information in the form of blockchain transactions from an actor A on the A-to-B transactions blockchain, and then uses that information to provide a service to an actor C. On determining that a new service should be provided to actor C, actor B spawns a workflow to create actor entity C on actor B's blockchain. Once created, a process to create a relationship entity B-to-C is created on that same blockchain. A new sub-blockchain for B-to-C transactions, governed by the relationship entity B-to-C is formed to hold service events actor B performs for actor C, which are recorded as blockchain transactions on the B-to-C transactions sub-blockchain.

Figure 5C:
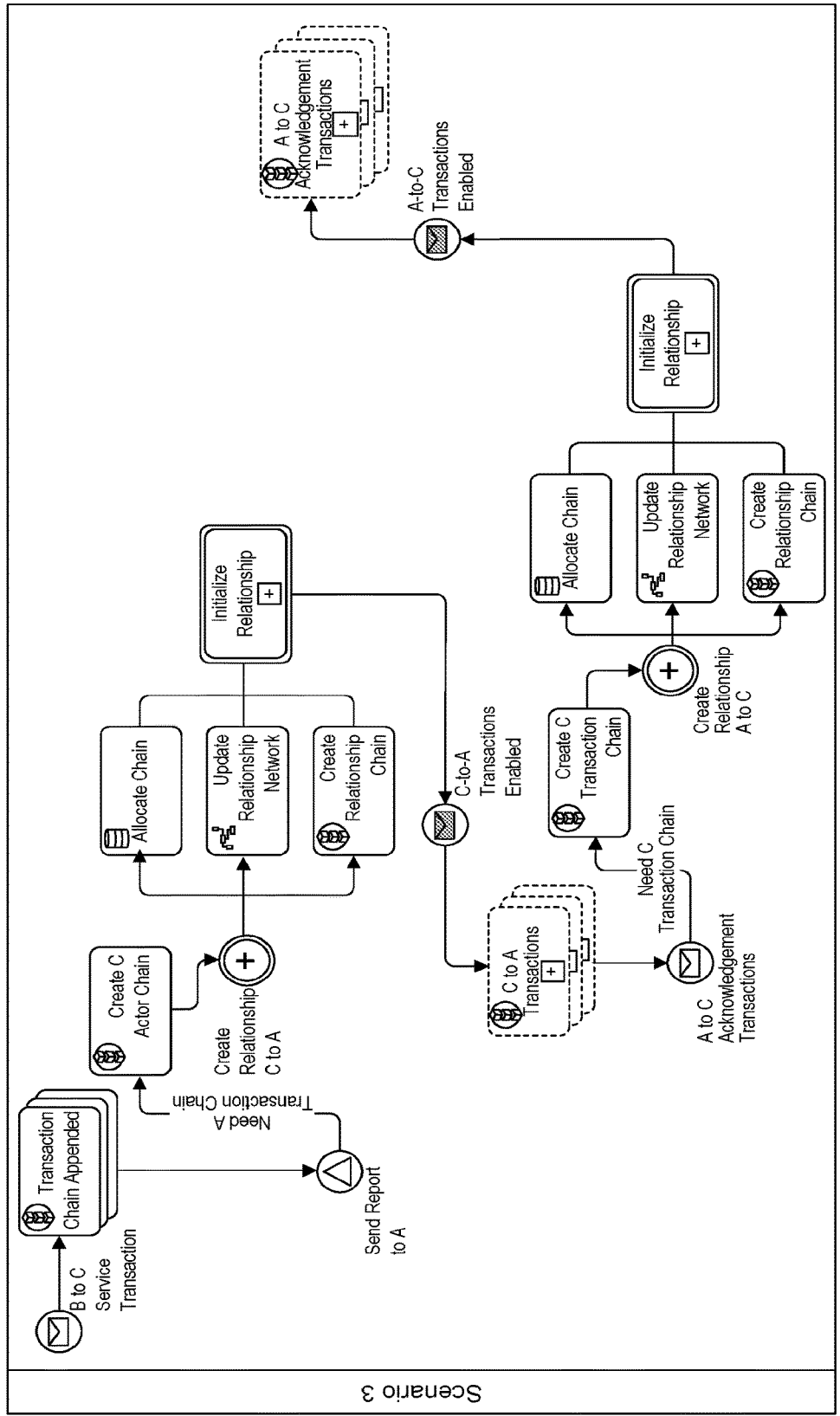
FIG. 5C is a diagram illustrating an example cyclic relationship-transaction interaction scenario for three entities, according to some embodiments.

FIG. 5C continues the examples from FIGS. 5A and 5B, showing an example relationship-transaction interaction 500C. In relationship-transaction interaction 500C, an actor C, who receives services from actor B recorded on a B-to-C sub-blockchain, reports on the services rendered from actor B to an actor A. Actor A then acknowledges the report back to actor C. This forms a cyclical relationship between actors A, B, and C. Actor A provides information to actor B. Actor B provides a service to actor C, and actor C sends a report of services rendered to actor A, who in turn acknowledges receipt of the report back to actor C. To perform this acknowledgement, actor C creates an actor entity A on its blockchain. Following the workflow outlined in FIGS. 5A and 5B, actor C creates a relationship entity C-to-A on its blockchain. Next, the sub-blockchain C-to-A is formed to record reporting transactions to actor A. On receipt of the first C-to-A report event, actor entity A creates actor entity C on its blockchain and then instantiates the relationship entity A-to-C. Finally, the sub-blockchain A-to-C is created to record acknowledgement events from actor A to actor C, and the acknowledgment event flows back to actor C.

Figure 5D:
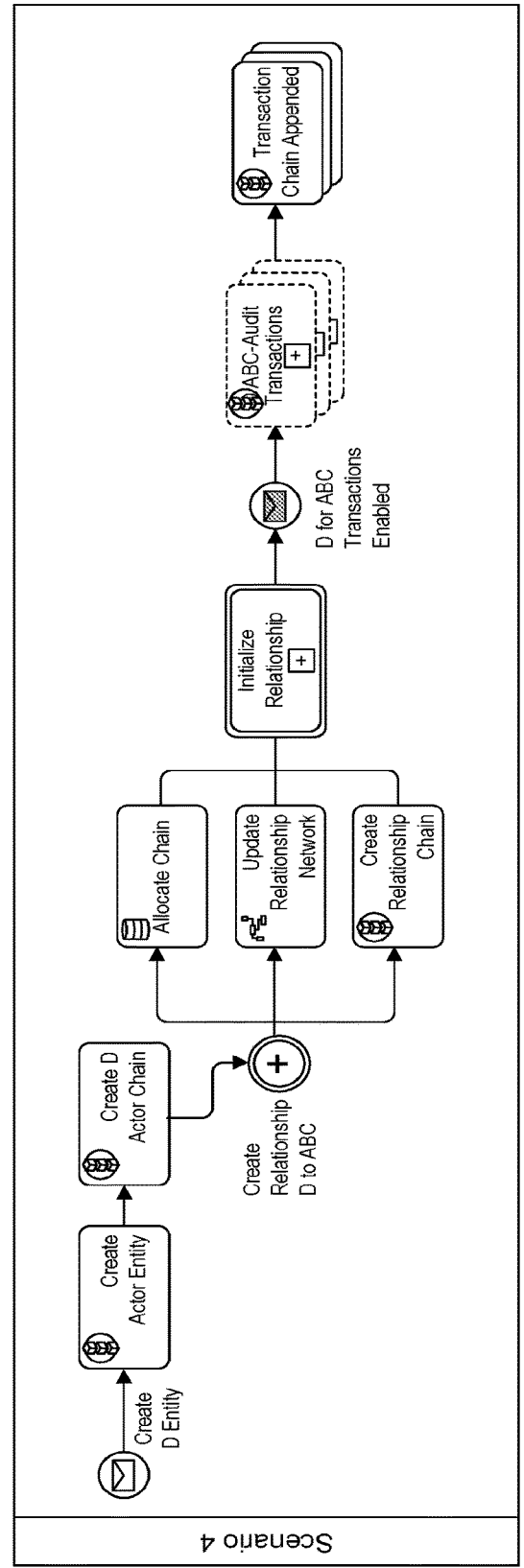
FIG. 5D is a diagram illustrating an example directed entity to grouped-entities relationship-transaction interaction scenario for four entities, according to some embodiments.

In FIG. 5D, continues the examples from FIGS. 5A, 5B, and 5C, showing an example relationship-transaction interaction 500D. In relationship-transaction interaction 500D, actor D is responsible for accounting and auditing all of the behavior between actor entities A, B, and C. To do so, actor D creates a relationship entity ABC on its blockchain and creates a sub-blockchain D-to-ABC to record auditing and accounting activity. As audit and accounting events are received by actor D, they are recorded on the transaction sub-blockchain D-to-ABC. This diagram illustrates a single entity to multiple or grouped entities relationship to clarify that the governing entity for transaction sub-blockchains are relationship entities, not actor entities.

Figure 4:
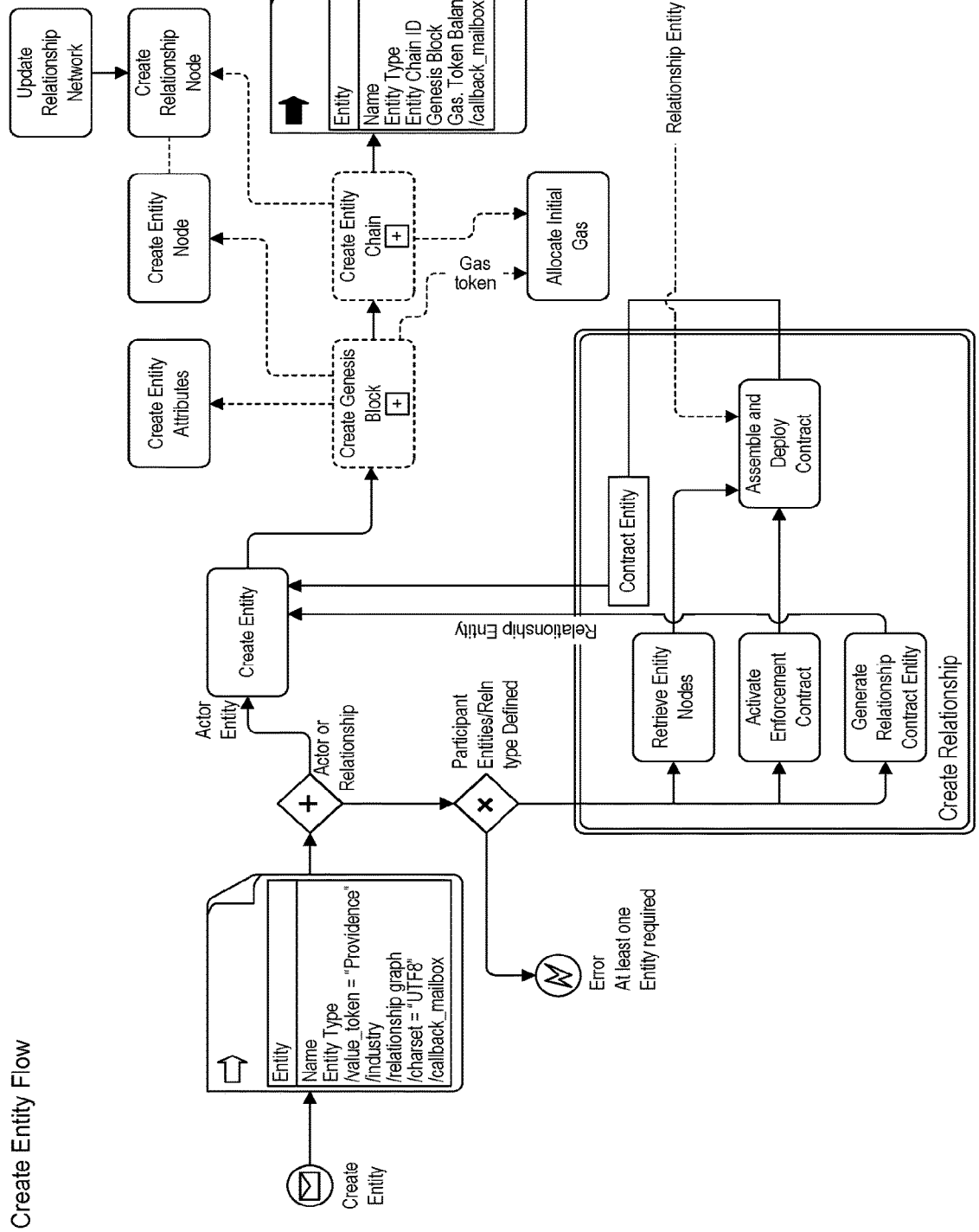
FIG. 4 is a diagram illustrating an example flow for entity creation, according to some embodiments.

Core blockchains 104 may provide a means to order the history of entity creation for the entire operational structure of the blockchain management system. Entities and their sub-blockchains may be the transactional components of core blockchains 104 and make up two distinct block types for core blockchains 104. In some embodiments, sub-blockchains 110 are created through linking blocks, such as linking blocks 112, that must consist of at least one governing entity. In some embodiments, all entities governing a linking block must exist on core blockchains 104 prior to a linking block that references them. Likewise, entities themselves may be ordered in their creation. In some embodiments, all actors are created prior to their behaviors and relationships. In a jointly-new transaction, the initiator may be recorded prior to the initiated, but the particular block persistence does not necessarily require the initiator to exist in a prior block. FIG. 4 shows an example process 400 for instantiating new core entities, their relationships to other entities, and their transactional blockchains.

1.1.2.3 Ordered History for Sub-Blockchain Creation

Sub-blockchains 110 may be created through genesis blocks, such as genesis blocks 106, on their new blockchains. This process is described later in this document. Core blockchains 104 may record the linking blocks for all sub-blockchains 110 that are spawned from entities on core blockchains 104. Linking blocks 112 may be appended to the specific blockchain that hosts the governing entity and may map to the sharding scheme adopted by the particular core blockchain in such a manner that the linking block lies in the same shard as the governing entity. Sub-blockchain mining may not occur in this case until all shards have acknowledged their relevant linking blocks through blockchain consensus mechanisms. In some embodiments, no sub-blockchains 110 may exist prior to the governing entity existence. In some multiple governing entities embodiments, sub-blockchain transactions may not begin until a quorum of sub-blockchain shards exist and that quorum has been acknowledged through consensus algorithms which may include weights, elections, allocations, promotions, defaults, etc.

1.1.2.4 Base Linking for Sub-Blockchains

When blockchains are created, a sharding implementation may be determined and recorded in the linking block of core blockchains 104 or governance blockchain 102 (e.g., when governing blockchain 102 is a transaction or relationship blockchain) and in the header block of the sub-blockchain (as described in more detail later). Linking blocks 112 may dictate at least the following: governing entities, value token(s) on the sub-blockchain, sharding implementations for sub-blockchains 110, sub-blockchain identifiers, and observational data. In some embodiments, linking blocks 112 are distinct block types and do not contain entity creation information. Each linking block among linking blocks 112 may be unique for a single sub-blockchain among sub-blockchains 110. In some embodiments, creating multiple sub-blockchains 110 in a single linking block is not permitted. In other embodiments, multiple sub-blockchains 110 may be created in a single linking block.

Once this nominal data is created, then the sub-blockchain may be instantiated as a link recorded in a graph data structure made up of the genesis block in the new blockchain, the linking block in the owning blockchain, and the nominal metadata stored in both block locations. The provenance for sub-blockchain creation may be maintained in both the owning and the newly created blockchains, with the relationship identifiers maintained in the graph data structure as graph nodes and edges.

1.1.2.5 Multilinked Blockchains

Figure 7:
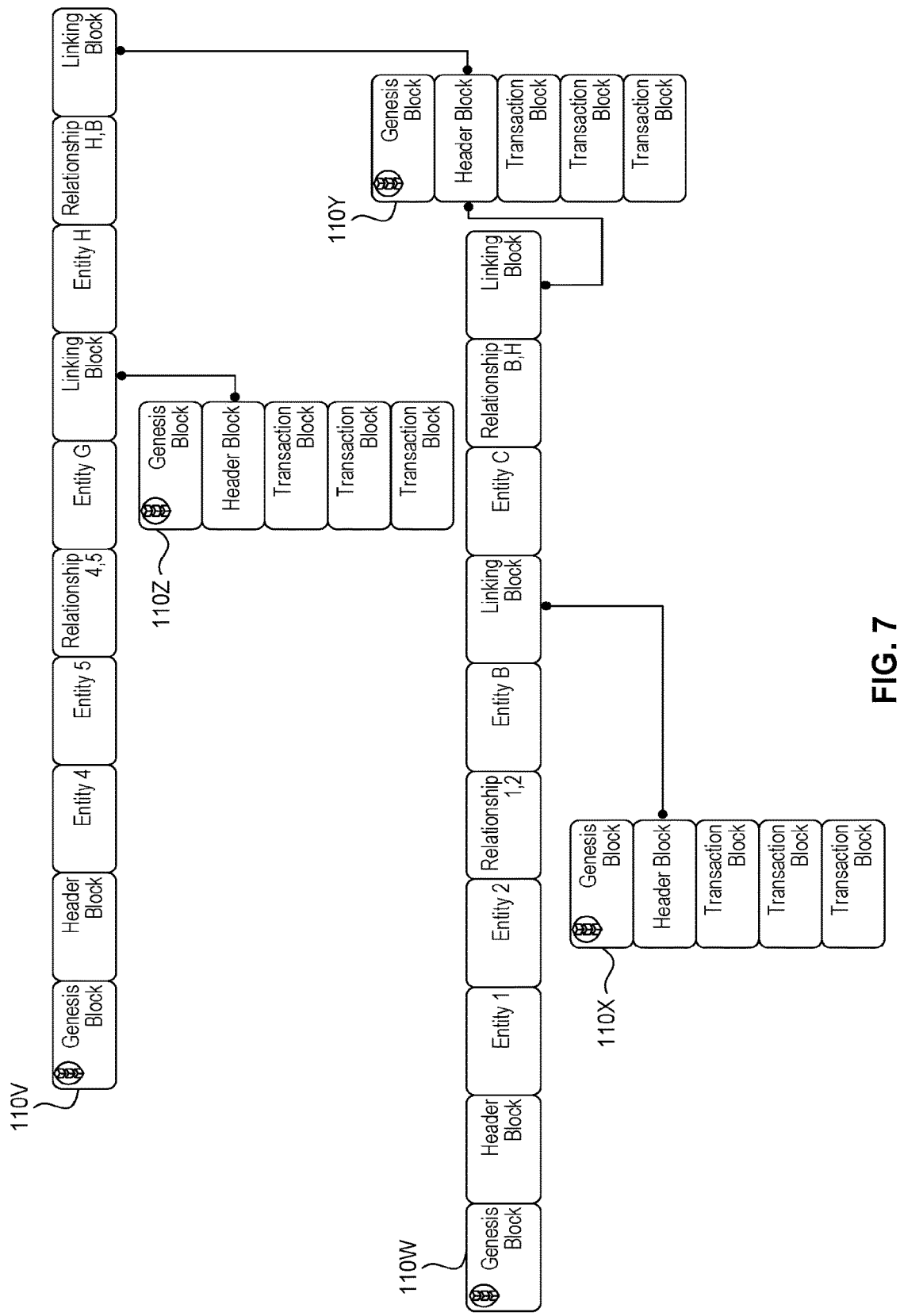
FIG. 7 is a diagram illustrating an example of multi-blockchain linking, according to some embodiments.

In a multilinked blockchain, governance may be shared between multiple core blockchains 104. In these multilinked blockchains, the owning entity is the relationship between entities on the core blockchain. FIG. 7 illustrates multilinking blockchains 700. In this example, core blockchain 110W with entity B creates a relationship to core blockchain 110V's entity H. Core blockchain 110V creates a relationship to core blockchain 110V's entity B. In this embodiment, the governing entity is the union of core blockchain 110V's relationship with entity B, H; and core blockchain 110V's relationship with entity H, B. The structure of the linking block and header block contain the union information for these combined core blockchains and relationships.

1.1.2.6 Blockchain Purpose

In some embodiments, the primary function for blockchains is to provide storage and provenance for behavior transactions (e.g., an increase in value), relationships, and contracts. The notion of behavior includes not only the transacted work between entities but also the recordation of the behavior of those entities as they change over time. By embedding both structures into the blockchain, the systems and methods described herein reliably capture an accurate view of the actor, the entities interacted, and the controls and behavior types for those interactions.

1.1.2.7 Governance Blockchain

As described in the foregoing, interlinking multiple independent and separately-scalable blockchains, such as N-Dimensional blockchain structure 100, may include a top-level, governance blockchain, such as governance blockchain 102, that specifies rules to which all sub-blockchains, e.g., core blockchains 104 and sub-blockchains 110, must adhere. Governance blockchain 102 may be limited by the rules to only contain linking blocks (in addition to the genesis block and appropriate header block or blocks). Governance blockchain 102 may store relationship information between governance blockchain 102 and core blockchains 104 that are linked to governance blockchain 102. In some embodiments, unlike relationships between other blockchains in N-Dimensional blockchain structure 100, the relationship information for governance blockchain 102 is not stored in the graph database. This prevents downstream actors (e.g., other blockchains) from tampering with the rules specified in governance blockchain 102.

In the context of FIG. 1, governance blockchain 102 includes blocks 0, 1, 2, 3, . . . n. Governance blockchain 102 may include a genesis block, one or more header block(s), and linking blocks. Governance blockchain 102 may be limited by rules in the form of structured programmable, hard-coded logic to only include linking blocks and relationships information and to not store any additional actors, entities, or other non-linking blocks.

Figure 3:
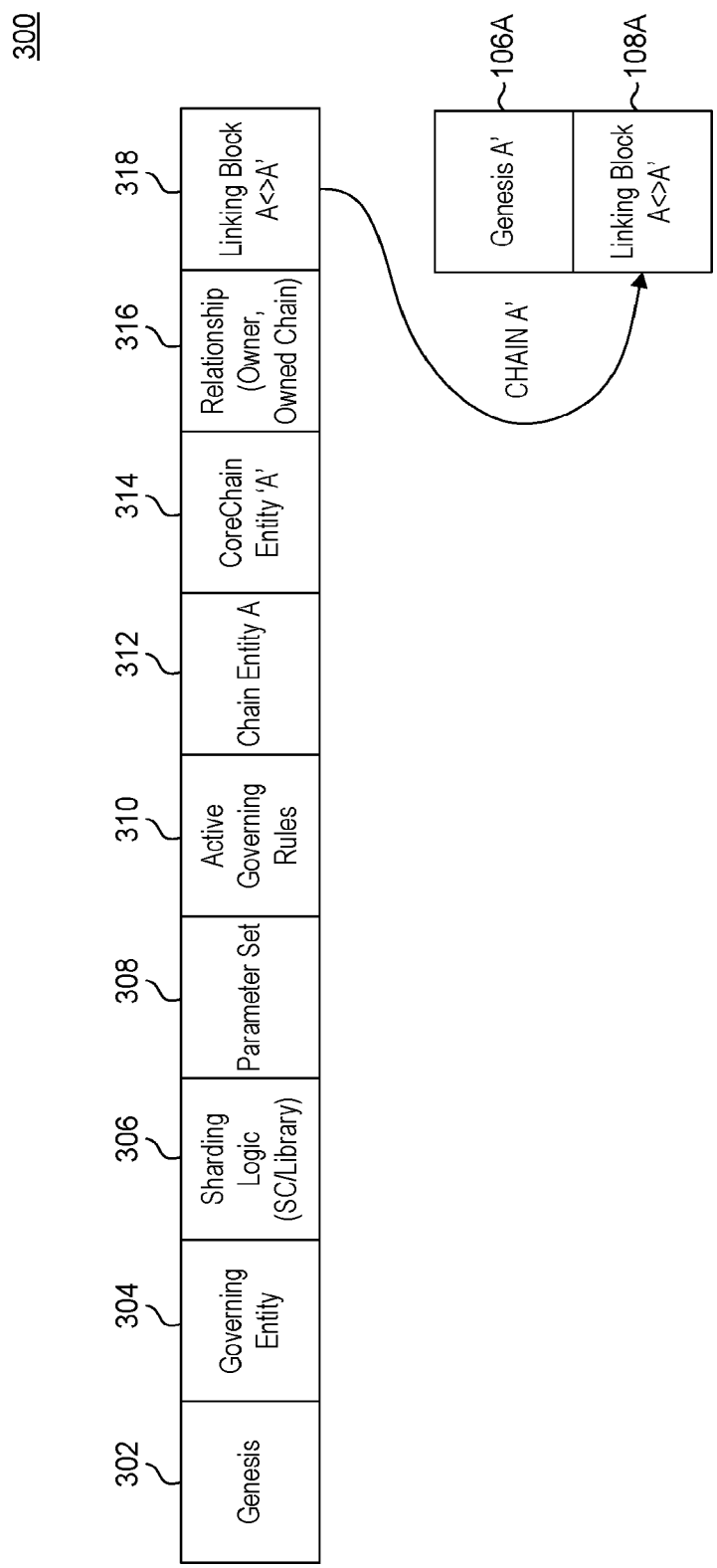
FIG. 3 is a diagram illustrating an exemplary governance blockchain, according to some embodiments.

FIG. 3 illustrates an exemplary governance blockchain 102. To aid the below discussion, this exemplary governance blockchain includes only one linking block, named as "A." The linking block "A" is linked to a core blockchain "A'."

In FIG. 3, governance blockchain 102 commences with genesis block 302, which is the initial block on governance blockchain 102. Genesis block 302 may be unique compared to and distinguishable from other blocks in governance blockchain 102 because it does not reference a previous block. FIG. 3 also illustrates multiple header blocks that may specify rules, e.g., smart contracts or other forms of structured, hard-coded programmatic code, parameters to apply to the rules to bring about an instantiation of the governance blockchain, and relationship information specifying relationships between entities in the governance blockchain and the core blockchains.

The exemplary embodiment in FIG. 3 includes several blocks labeled: "Governing Entity," "Sharding Logic (SC/Library)," "Parameter Set," and "Active Governing Rules," representing governing-entity block 304, sharding-logic block 306, parameter-set block 308, and active-governing-rules block 310, respectively. The data contained within these blocks will be described in further detail below. While these blocks are displayed as separate blocks within FIG. 3, the concepts described below need not be implemented as actual separate blocks. In some embodiments, the information could be contained in a single header block, less blocks than are displayed, or more blocks than are displayed.

Governing-entity block 304 may specify a uniquely identifiable name for governance blockchain 102. The governing entity may be thought of as the owner of governance chain 102. Governing-entity block 304 may further specify a version number, a timestamp, a counter, and other information about the owner of governance blockchain 102.

Sharding-logic block 306 may provide programmable rules that define sharding criteria applied to the governance blockchain. Sharding-logic block 306 may specify the conditions under which an additional shard (e.g., a core blockchain) may be created and linked to governance blockchain 102. For example, the sharding-logic may specify that an additional shard should occur each day at noon. In such an example, day after day, governance blockchain 102 would add an additional core blockchain. Sharding-logic block 306 may further provide a scaling algorithm that indicates more complicated scenarios in which governance blockchain 102 shards/expands. In some embodiments, sharding logic may take the form of a smart contract or other suitable library/programmatic code. In addition, sharding-logic block 306 may specify when a constraint violation occurs within blockchains in N-Dimensional blockchain structure 100. Sharding-logic block 306 may specify a scaling algorithm that determines when core blockchains 104 should branch off additional sub-blockchains 110. Sharding-logic block 306 may specify decision criteria for determining a relationship determination to specify when a relationship should be added to the graph database. In some embodiments, the sharding logic may be written to governance blockchain 102 using more than one block.

Parameter-set block 308 may include a set of parameters to apply to the sharding-logic code. The parameters may be variables or input to the sharding logic. These parameters may specify the nature of an instantiation of governance blockchain 102. Parameter sets may include a variety of data and data types. Parameter sets may ultimately be replaced by an updated parameter set in governance blockchain 102 that specifies different instantiations/behaviors for governance blockchain 102. For example, parameter-set block 308 may specify parameters to feed into a sharding algorithm to determine a shard set. At a later point in time, parameter-set block 308 may be recreated by including a new parameter block in governance blockchain 102 specifying parameters for the sharding algorithm. In this fashion, the sharding algorithm is maintained for the life of the chain, but by updating the parameters the sharding logic may be adjusted.

Active-governing-rules block 310 may be created by combining the sharding logic with the parameter set. Various examples of the nature of the rules are provided above in the description of the sharding logic. The active governing rules may be applied to create entities within the governance blockchain. The rules may be recreated and re-added to the governance chain at a later time based on an updated parameter set to specify new behaviors within the N-Dimensional Blockchain structure.

The blocks "Chain Entity A", "Core Chain Entity A'", "Relationship (Owner, Owned Chain)", and "Linking Block A< >A'", represent unique identifier block 312, core-chain identifier block 314, relationship block 316, and linking block 318, respectively, and may be repeated according to how many shards exist in a given governance blockchain and may be created in accordance with the active governing rules.

Unique identifier block 312 may be a unique identifier for an entity in governance chain 102. "Entity A" may uniquely identify a linking block. Core-chain identifier block 314 may uniquely identify core chain A', e.g., core blockchains 104 branched from governance blockchain 102.

Relationship block 316 may be added to governance blockchain 102 to store the relationship between the owner (A) and the owned blockchain (A'). By storing the relationships between the governance chain entities and the core chains, the relationship need not be stored in the graph database. This prevents manipulation of governance blockchain 102 by downstream actors (such as core blockchains 104 and sub-blockchains 110). Thus, the rules specified by governance blockchain 102 cannot be tampered with.

Linking block 318 may be a pointer to the linking block in chain A' and may contain reference information to jump to the core chain A'.

Chain A', reflected in FIG. 3, is a core blockchain, such as core blockchains 104 linked to the governance blockchain. Chain A' includes a genesis block (here, "Genesis A'") and a linking block with a reference back to the linking block in the governance blockchain. As described throughout the above description, chain A' may store entities, observations, transactions, etc. that vary across scenarios and use cases.

2 Discussion of Certain Aspects of Blockchain and Graph Technologies

A key issue or limitation with existing blockchain technology for recording behavior and relationships is its chained nature. Although following a track of actions logically proceeds along a temporal path, the relationships between entities are often not governed by time alone (or events at all) and so require additional notions of dependency, directionality, causation, implication, control and governance, ownership, and sibling relationships. The structure of graph technology excels at providing robust access and storage of these sorts of vectorized communities. Thus, embodiments described herein employ graph technology to manage the linking between entities and links between blockchains. Using graph technology for vectorized relationship management provides the capability to maintain, order, and keep provenance for N-dimensional blockchain structures, such as N-Dimensional blockchain structure 100.

Conversely, graph technology is not good at providing linear or temporal provenance since there is no enforcement of such orders internally. Thus, embodiments described herein leverage the blockchain to provide this capability. Working in concert then, graph and blockchain technologies together provide both high performance and feature rich relationships with the provenance and chain of custody controls required for guaranteed ordering. Accordingly, embodiments disclosed herein form a hybrid database and data structure that leverages the benefits of both blockchain and graph technologies while avoiding their respective limitations.

Benefits of this fusion of blockchain and graph technology include, but are not limited to, significant reduction in transaction times and significant increase in search speeds. Feature benefits include providing the capability for a graph, community, clustered, directed, cyclic, and acyclic networks to compare information temporally. For example, in a graph network describing the routes taken by taxis in New York City, it is not possible to compare the routes taken in the graph today with the graph as it existed yesterday, or the week before without having distinct copies of the graph yesterday and today. Adding blockchain provenance to this graph problem would allow queries and comparisons such as "how did the routes taken by medallion 3467 today compare with the same routes a week ago? 2 weeks ago? and a month ago?"

Adding graph technology to blockchains allows for multi-dimensional relationships to be retrieved without linear blockchain traversal. For long blockchains and for blockchains with a high transaction volume, retrieving related entities through searching or simple requests can take a long time. In many cases, traversing the number of blocks between two entities can require substantial input/output and computational resources on a computer. This time compounds for multi-dimensional relationships since that distance must be traversed repeatedly within the bounds of a single query. Graph technology excels at directed, point-to-point, point-to-multipoint, multipoint-to-multipoint, and community detection and clustering queries by optimizing the retrieval distances. (Indeed "shortest path" is a standard benchmark test for graph technology generally speaking.) Maintaining relationships in a graph where nodes are stored in the blockchain means that the systems and methods disclosed herein can retrieve the blocks with those nodes directly without traversing the chain at all. This may increase the atomic performance of these operations against the blockchain by orders of magnitude. Additionally, by maintaining relationships in graph structures, the system does not require the same blockchain, or same blockchain provider for node storage. The systems and methods do not require that a node reside in a blockchain, but could be in any form of retrievable storage including (but not limited to) other databases, files, key-value stores, programmatic outputs, constants, memory addresses and regions, hardware devices, key stores, and cryptographic wallets.

2.1 Exemplary Relational Database Schema

FIGS. 2A-2D provide a representation of a relational database structure corresponding to portions of N-Dimensional blockchain structure 100 portrayed in FIG. 1. Specifically, the representation displayed in FIGS. 2A-2D quantifies relational data structures for the portions of core blockchain 104A and sub-blockchain 110C and sub-blockchain 110E. These relational data structures are merely exemplary, and multitudinous schemas and approaches could be employed to implement a graph database from the basic keys and relationships shown, i.e., deriving nodes and edges in a graph database. Overlaying a graph across N-Dimensional blockchain structure 100 provides enhanced searching capabilities at large scales and allows a different level of analytics and functions to be performed across the same data. For brevity, the tables displayed in FIGS. 2A-2D do not include all of the chains displayed in FIG. 1, only a representative sample to serve the following explanation.

In FIG. 2A, a "Chain" table 200A is displayed. Table 200A houses information about the one or more blockchains, such as core blockchains 104 and sub-blockchains 110, contained in N-Dimensional blockchain structure 100. The exemplary embodiment in FIG. 2A includes the columns "Chain_Id," "Owning_Entity," "Chain_Name," "Chain_Address," "Genesis_Block_Id," "Trans_Id," and "Token_Type." For instance, core blockchain 104A is displayed with a "Chain_Id" of 1001, while the sub-blockchain 110C is displayed with a "Chain_Id" of 1002. The "Token_Type" table references the table portrayed in FIG. 2D listing various types of blockchain protocols and associated tokens.

In FIG. 2B, an "Entity" table 200B is displayed. Table 200B houses information about various entities in N-Dimensional blockchain structure 100. These are the nodes in the graph database and reflect actors within the blockchains. The exemplary embodiment in FIG. 2B includes the columns "Entity_Id," "Chain_Id," "Block_Id," and "Transaction_Id." The "Chain_Id" column references the table displayed in FIG. 2A.

In FIG. 2C, an "Entity_Chain_Links" table 200C is displayed. Table 200C houses information about the various links contained in the N-Dimensional blockchain structure 100, i.e., the relationships or edges in the graph database. The exemplary embodiment in FIG. 2C includes the columns "Entity_Chain_Link_Id," "Chain_Id," "Block_Id," "Transaction_Id," and "Linked Chain_Id," "Linked Transaction_Id." For instance, the link between core blockchain 104A and sub-blockchain 110C is displayed in the first row.

In FIG. 2D, a "Token" table 200D is displayed. Table 200D stores information about the tokens contained in N-Dimensional blockchain structure 100. One skilled in the relevant art(s) will understand that the inclusion of the "Token" table facilitates the incorporation of multitudinous blockchain protocols within N-Dimensional Blockchain structure 100 and decouples the system from any particular protocol. In some embodiments, alternate storage mechanisms such as conventional database systems may be incorporated into the structure along with the blockchains.

2.2 Additional Features and Capabilities

The following is a list of additional features and capabilities that may be implemented in the systems and methods disclosed above:

(1) The capability to provide provenance to relationship data. Specifically providing temporal history which is irrefutable, provable, non-repudiated to graph data that is verifiable and trustable independent from the content of that data itself or from the method by which that relationship data is stored, read, and manipulated.

(2) The capability to provide provenance between independently functioning blockchains. This includes public and private blockchains and does not depend on any particular implementation of blockchain technology on either end of the link. This includes disparate blockchains and dependent blockchains. This is independent of the data and purpose of the linked blockchains in question.

(3) The procedure for automatically electing a new pool of miners at the creation of a new blockchain is independent of the mining platform, the type or mechanism of the blockchain being created, or the intent and acceptance of any particular mining platform with an offer for a new blockchain. In some embodiments, the essential functions for new mining elections include:
 a) The procedure for electing, appointing, or selecting miners for a new blockchain altogether;
 b) The capability to elect a new mining set, which then supervises and governs the blockchain miner pool creation in 3a;
 c) The capability to elect a new validator network with representative tokens, to create the new mining set as outlined in 3b for new blockchains in 3a.

(4) The capability to announce new concepts into consensus networks including, but not limited to:
 a) blockchains,
 b) miners,
 c) mining sets,
 d) tokens,
 e) validator networks,
 f) relationships,
 g) entities,
 h) elections,
 i) capabilities, and/or
 j) to govern their introduction to the running platform.

(5) The capability to provide Validator networks that may
 a) secure the blockchain,
 b) control the creation of relationships,
 c) verify and authenticate behavioral transactions,
 d) provide a common means of value exchange,
 e) provide a common means of network capability,
 f) provide trust and verifiability to network participants, and/or
 g) governs mining activity on the network.

(6) Customized proof of work/consensus that allows Validator networks to provide alternate mechanisms for verification, authentication, and proof of operational accuracy that may perform one or more of the following:
 a) Relate or pertain to behavioral transactions on the network,
 b) Increase or decrease distributed trust mechanisms on the network,
 c) Augment, streamline, or fan out transactions and content on the network, or
 d) Otherwise alter the means of participation in a manner that benefits or detriments the network and participants as needed and that may be governed through contractual elections as outlined by claim section 3, for example in a participant-only network concept.
 e) Increase the validity, accuracy, usability and provenance of the data involved in transactions on the network.

These improvements may be considered benefit-of-work or benefit-of-stake validation. The current methods of mining blocks on blockchain implementations like ETHEREUM by proof-of-work or proof-of stake use enormous computational power to solve cryptographical puzzles, which end up validating the blocks through a consensus method. But the idea of proof-of-work or proof-of-stake is only inherently useful to the blockchain itself.

The benefit-of-work or benefit-of-stake model, described herein, would allow blockchain miners to do computational work that benefits the owner of a private blockchain or the stakeholders of a public blockchain instead of using the compute resources to just solve a cryptographical puzzle. The work that needs to be accomplished by the stakeholder can be integrated into the benefit-of-work model and the miners would do the actual work as part of mining and validating the block. Generally, improvements to the transactions, content, relationships, entities, data validity or behaviors of the participant network would factor into the governance and security of the validator network core blockchain(s), sub-blockchain(s), and multilinked blockchain(s).

Figure 8:
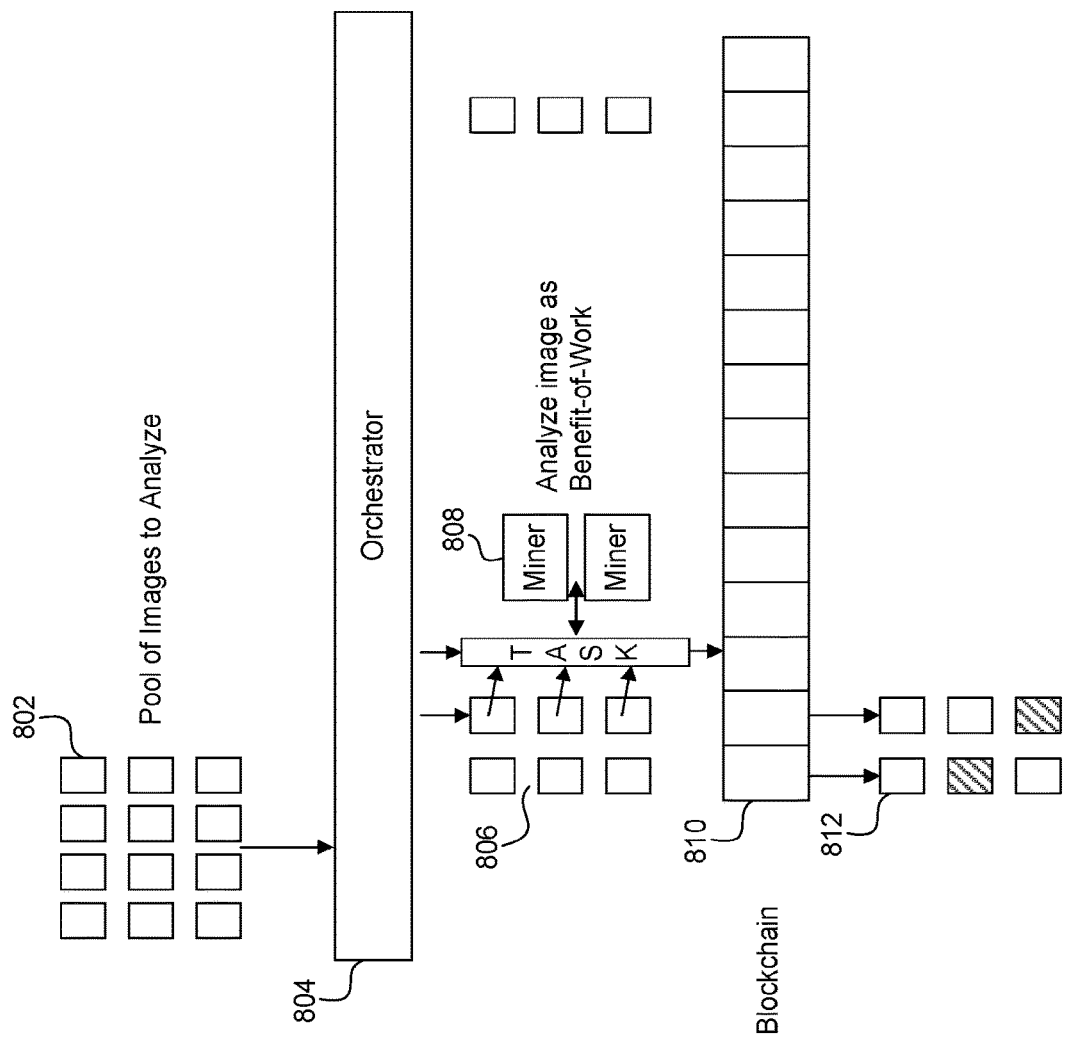
FIG. 8 is a diagram illustrating examples of benefit-of-work and benefit-of-stake, according to some embodiments.

For instance, if a company has data that needs to be cleansed or files that need to be translated or meta-data indexing that needs to be done on millions of files, that work can actually be accomplished by the blockchain miners as the blockchain grows. FIG. 8 demonstrates benefit-of-work validator network 800. In this example, the network participants leverage image data in transactions for their operations. The network validation scheme analyzes images as they come into the network in transactions and adds information about the images (size, color range, detected components, etc.). This information is stored along with the source images into the blockchain and provides additional information to the network participants not available in the original transactional inputs. This additional information benefits all network participants and the value of participating in the network increases because of the additional benefit-of-work performed for all transactions.

(7) The capability to leverage sharding of blockchain content for scalability without sacrificing provenance for any particular behavior or blockchain.

(8) The capability to leverage entity ranges and sharding to provide additional length (concatenation) or parallelism (range sharding) to any governed blockchain.

(9) The capability to store blockchain relationships in a graph database,
   a) while maintaining the metadata necessary to construct or reconstruct the relationship between blockchains without reference to the blockchains themselves,
   b) and/or with complete provenance around the notion of the blockchain relationships to each other and the actions and methods by which those relationships were instantiated.

(10) By making use of the methods in (6), the systems and methods disclosed herein may gain the capability to leverage embedded, tiny, or other alternate and specialized computer systems to provide mining capabilities, election capabilities, and deliver in the capabilities described in (6). These systems may embody these capabilities in hardware, software, or hybrid methods.

Figure 9:
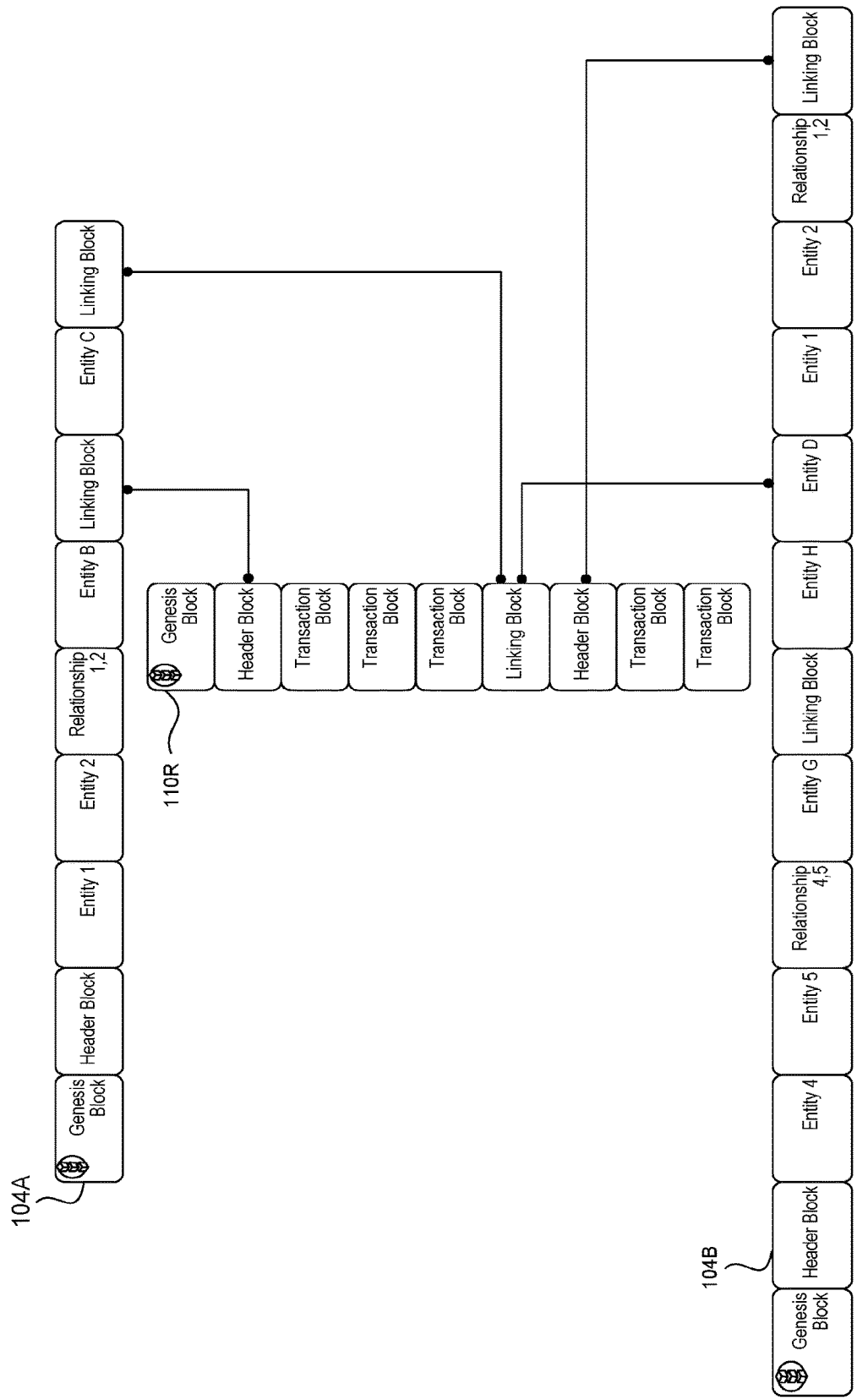
FIG. 9 is a diagram illustrating an example of detached blockchain reassignment, according to some embodiments.

(11) Embodying detachable blockchains without losing provenance in a larger structure or blockchain of behavior. These detachable blockchains may be completely extracted into other physical embodiments and devices or removed altogether. Detachable blockchains may also have their ownership and governance reassigned by terminating their previous governance and associated new linking and header blocks to the blockchain. FIG. 9 illustrates detached chain 900, with a reattachment of sub-blockchain 110R from core blockchain 104A to core blockchain 104B. A new linking and header block are added to the sub-blockchain, and new entities added to core blockchain 104B to facilitate referenced and continued transactions on sub-blockchain 110R. One of the key criticisms of distributed ledger technology, including blockchain, is that in cases where destruction, deletion, or removal are mandated (as by the recent EU Global Data Privacy Regulations (GDPR) for example), the technology has no good solution by definition. The structure outlined above allows for the destruction, removal, and deletion of data altogether as well as to reassignment of ownership. This is a marked improvement for blockchain technology.

Figure 11:
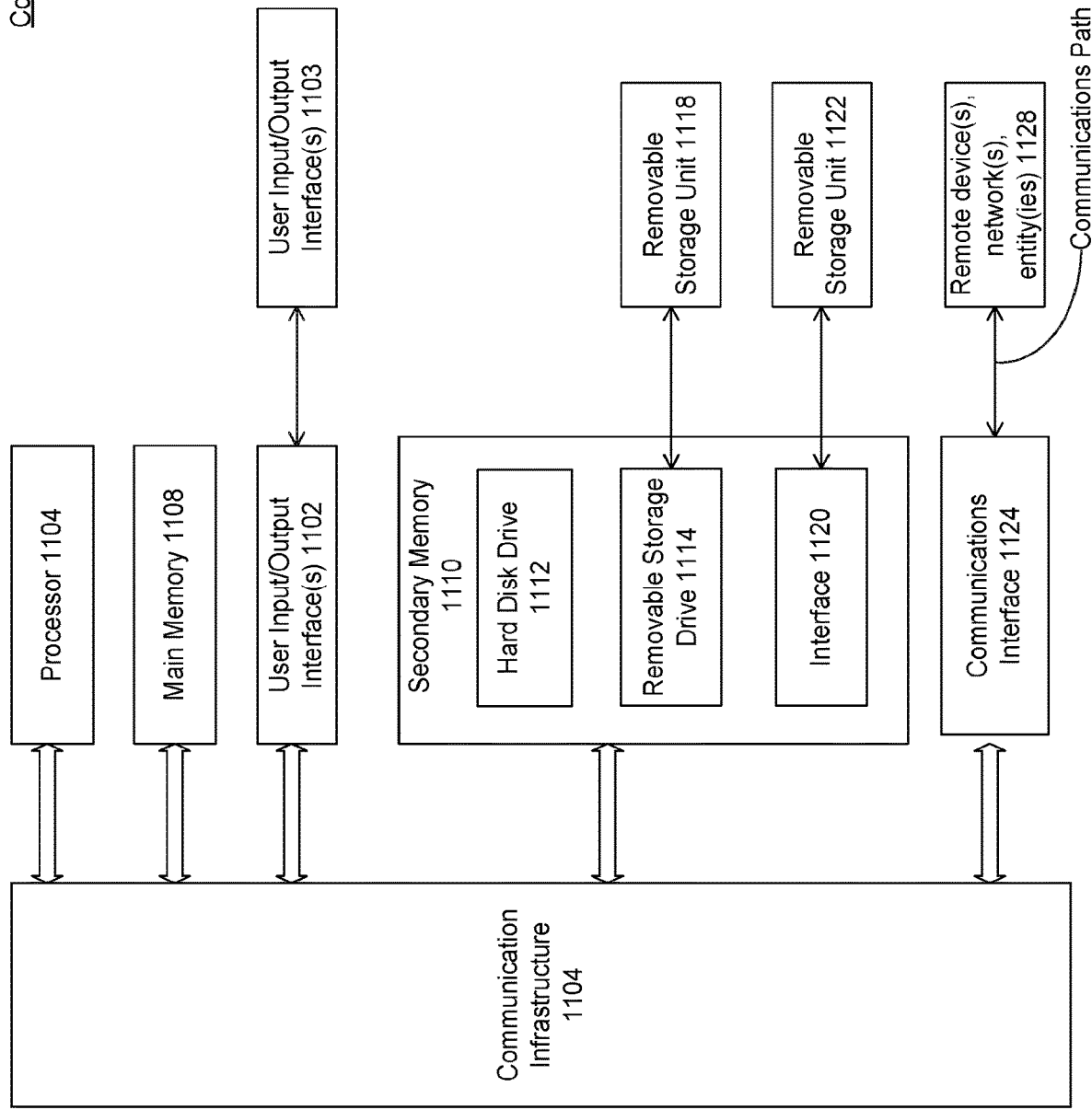
FIG. 11 is a block diagram illustrating an example computer system, according to some embodiments.

FIG. 11 illustrates an example computer system that may be used to implement various embodiments of the disclosure. Various embodiments can be implemented, for example, using one or more computer systems, such as computer system 1100 shown in FIG. 11. Various embodiments may be implemented using a plurality of networked computer systems, such as the Internet. Such a network may include a plurality of computer systems, servers, mobile devices, etc. that are geographically distributed. Computer system 1100 may be any well-known computer capable of performing the functions described herein, such as computers available from INTERNATIONAL BUSINESS MACHINES, APPLE, SUN, HP, DELL, SONY, TOSHIBA, etc. Computer system 1100 may be a server or a mobile device.

Computer system 1100 includes one or more processors (also called central processing units, or CPUs), such as a processor 1104. Processor 1104 is connected to a communication infrastructure or bus 1106.

Computer system 1100 may include user input/output device(s) 1103, such as monitors, keyboards, pointing devices, touch screens, etc., which communicate with communication infrastructure 1106 through user input/output interface(s) 1102.

Computer system 1100 may include a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein. The methods and flow diagrams disclosed here, including those shown in the Figures, may be implemented as control logic or instructions stored on a non-transitory computer readable medium, which, when executed, cause one or more processors to perform the control logic or instructions.

It is to be appreciated that the Detailed Description section is intended to be used to interpret the claim(s).

The disclosed embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the disclosed embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system for an N-dimensional, interlinked blockchain structure, the system comprising:
    a processor coupled to memory, wherein the processor is configured to record in the memory a plurality of interlinked blockchains comprising:
        A first-level blockchain linked to a plurality of second-level blockchains, each second-level blockchain comprising a header block linked to a linking block on the first-level blockchain, wherein the header block of each second level blockchain in the plurality of second-level blockchains immediately follows a genesis block; and
        a plurality of third-level blockchains, each third-level blockchain linked to at least one of the plurality of second-level blockchains,
        wherein the plurality of second-level blockchains record entity information and linking information,
        wherein the plurality of third-level blockchains record information about interactions between one or more entities recorded on the plurality of second-level blockchains, and
        wherein the first-level blockchain is agnostic to the blockchain implementations of the second- and third-level blockchains; and
    a graph database recording links between the plurality of second-level blockchains and the plurality of third-level blockchains as edges in the graph database; and
    wherein the processor is further configured to:
        record, on a second-level blockchain of the plurality of second-level blockchains, a first set of rules describing behavior of a first third-level blockchain and a second set of rules describing behavior of a second third-level blockchain, wherein the first set of rules and the second set of rules are immutable, the first set of rules differ from the second set of rules, and the blockchain implementation of the first third-level blockchain differs from the blockchain implementation of the second third-level blockchain.

2. The system of claim 1, the processor further configured to:
    receive a request for information;
    gather the information by querying the graph database to determine a particular third-level blockchain in the plurality of third-level blockchains to traverse; and
    traverse the particular third-level blockchain to satisfy the request for information.

3. The system of claim 1, wherein the first set of rules further provides a scaling algorithm comprising decision criteria for determining relationships in the graph database.

4. The system of claim 1, wherein the first set of rules further provides a manner of determining a constraint violation.

5. The system of claim 1, wherein the graph database records the one or more entities as nodes in the graph database.

6. The system of claim 1, wherein the links between the plurality of second-level blockchains and the plurality of third-level blockchains represent relationships between the one or more entities recorded on the plurality of second-level blockchains.

7. The system of claim 1, wherein each third-level blockchain of the plurality of third-level blockchains includes comprises a header block linked to a second-level blockchain in the plurality of second-level blockchains.

8. The system of claim 1, wherein the processor is further configured to:
    add an additional second-level blockchain to the plurality of second-level blockchains.

9. The system of claim 1, wherein the graph database further comprises a node describing data that does not reside on a blockchain.

10. A computer-implemented method for creating an N-dimensional, interlinked blockchain structure, the method comprising:
    Creating a plurality of interlinked blockchains comprising:
        A first-level blockchain linked to a plurality of second-level blockchains, each second-level blockchain comprising a header block linked to a linking block on the first level blockchain, wherein the header block of each second-level blockchain in the plurality of second-level blockchains immediately follows a genesis block; and
        a plurality of third-level blockchains, each third-level blockchain linked to at least one of the plurality of second-level blockchains, wherein the plurality of second-level blockchains record entity information and linking information, wherein the plurality of third-level blockchains record information about interactions between one or more entities recorded on the plurality of second-level blockchains, wherein the first-level blockchain is agnostic to the blockchain implementations of the second- and third-level blockchains;

maintaining a graph database;

recording links between the plurality of second-level blockchains and the plurality of third-level blockchains as edges in the graph database;

recording, on a second-level blockchain in the plurality of second-level blockchains, a first set of rules describing behavior of a first third-level blockchain and a second set of rules describing behavior of a second third-level blockchain, wherein the first set of rules and the second set of rules are immutable, wherein the first set of rules differ from the second set of rules, and the blockchain implementation of the first third-level blockchain differs from the blockchain implementation of the second third-level blockchain.

11. The method of claim 10, further comprising:

receiving a request for information;

gathering the information by querying the graph database to determine a particular third-level blockchain in the plurality of third-level blockchains to traverse; and traversing the particular third-level blockchain to satisfy the request for information.

12. The method of claim 10, wherein the first set of rules further provides a scaling algorithm comprising decision criteria for determining relationships in the graph database.

13. The method of claim 10, wherein the first set of rules further provides a manner of determining a constraint violation.

14. The method of claim 10, wherein the graph database records the one or more entities as nodes in the graph database.

15. The method of claim 10, wherein the links between the plurality of second-level blockchains and the plurality of third-level blockchains represent relationships between the one or more entities recorded on the plurality of second-level blockchains.

16. The method of claim 10, wherein each third-level blockchain of the plurality of third-level blockchains comprises a header block linked to a second-level blockchain in the plurality of second-level blockchains.

17. The method of claim 10, further comprising:

adding an additional second-level blockchain to the plurality of second-level blockchains.

18. The method of claim 10, wherein the graph database further comprises a node describing data that does not reside on a blockchain.

* * * * *

UNITED STATES PATENT AND TRADEMARK OFFICE
CERTIFICATE OF CORRECTION

PATENT NO. : 11,023,458 B2
APPLICATION NO. : 16/812848
DATED : June 1, 2021
INVENTOR(S) : Quick et al.

Page 1 of 1

It is certified that error appears in the above-identified patent and that said Letters Patent is hereby corrected as shown below:

In the Specification

In Column 9, Line 9, delete "110V's" and insert -- 110W's --, therefor.

In Column 9, Line 10, delete "110V's" and insert -- 110W's --, therefor.

In Column 13, Lines 21-22, delete ""Linked Chain_Id," "Linked Transaction_Id."" and insert -- "Linked_Chain_Id," "Linked_Transaction_Id." --, therefor.

In the Claims

In Column 17, Claim 1, Line 43, delete "A" and insert -- a --, therefor.

In Column 18, Claim 7, Line 36, delete "blockchains includes" and insert -- blockchains --, therefor.

In Column 18, Claim 10, Line 50, delete "Creating" and insert -- creating --, therefor.

In Column 18, Claim 10, Line 52, delete "A" and insert -- a --, therefor.

Signed and Sealed this
Second Day of November, 2021

Drew Hirshfeld
*Performing the Functions and Duties of the
Under Secretary of Commerce for Intellectual Property and
Director of the United States Patent and Trademark Office*